(12) United States Patent
Takemura et al.

(10) Patent No.: US 6,267,511 B1
(45) Date of Patent: Jul. 31, 2001

(54) ROLLING BEARING

(75) Inventors: Hiromichi Takemura; Yasuo Murakami, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/262,846

(22) Filed: Mar. 5, 1999

(30) Foreign Application Priority Data

Mar. 5, 1998 (JP) .................................................. 10-053724

(51) Int. Cl.$^7$ ............................. F16C 33/32; F16C 33/62
(52) U.S. Cl. ......................... 384/492; 384/625; 420/104
(58) Field of Search .................................... 384/462, 463, 384/492, 456; 148/316, 333, 317; 420/104, 413; 428/457, 469, 698

(56) References Cited

U.S. PATENT DOCUMENTS

| | | | |
|---|---|---|---|
| 4,992,111 | 2/1991 | Yamada et al. | 148/12.4 |
| 5,853,660 | * 12/1998 | Murakami et al. | 420/104 |
| 5,998,042 | * 12/1999 | Tanaka et al. | 428/627 |

FOREIGN PATENT DOCUMENTS

| | | | |
|---|---|---|---|
| 42 17 566 | 3/1993 | (DE) | F16C/33/66 |
| 6-33441 | 5/1994 | (JP) | C22C/38/00 |
| 7-103241 | 4/1995 | (JP) | F16C/33/64 |
| 7-72565 | 8/1995 | (JP) | F16C/33/62 |

OTHER PUBLICATIONS

"NSK", Hauptkatalog, Katalog 7310, 1973, NSK Kugellager GmbH Dusseldorf, p. 58.

* cited by examiner

Primary Examiner—Charles A. Marmor
Assistant Examiner—Tisha D. Lewis
(74) Attorney, Agent, or Firm—Sughrue, Mion, Zinn, Macpeak & Seas, PLLC

(57) ABSTRACT

An inner ring 3 of the rolling bearing is formed by a steel material having the following composition. This steel material contains as alloying constituents C, Si, Mn and Cr in an amount of from 0.65 to 1.20% by weight, from 0.10 to 0.70% by weight, from 0.20 to 1.20% by weight and from 0.20 to 1.80% by weight, respectively, and has an oxygen content of not more than 16 ppm. The content of retained austenite left after heat treatment is from 0 to 6% by volume and the surface hardness HRC of the bearing surface is from not less than 57 to not more than 65. Accordingly, it is possible to drastically prolong the lifetime of a rolling bearing operating under high vibration and load such as bearing for alternator.

10 Claims, 1 Drawing Sheet

ROLLING BEARING

BACKGROUND OF THE INVENTION

The present invention relates to a rolling bearing. More particularly, the present invention relates to a grease-lubricated bearing for engine auxiliary machinery (e.g., alternator, solenoid clutch, inter-pulley, compressor for car air conditioner, water pump).

In recent years, as the size and weight of automobiles have decreased, engine auxiliary machinery has been called for lower size and weight as well as higher performance and output. For example, a bearing for alternator is acted upon by high vibration and high load (acceleration of gravity: approx. 4 G to 20 G) accompanying a high speed rotation at the same time with the actuation of the engine through a belt. Accordingly, a grease-lubricated bearing, if used for alternator, is liable to seizing that causes locking. Such a grease-lubricated bearing for alternator is also disadvantageous in that the bearing surface (so called as a rolling contact surface which is brought in contact with rolling elements) of the outer ring as a stationary race is liable to premature peeling. As a result, such a grease-lubricated bearing for alternator cannot be provided with a sufficiently prolonged life.

As a technique for prolonging the life of bearings operating under high vibration and high load there is disclosed a process which comprises subjecting a stationary race made of a high carbon-chrome bearing steel (SUJ2) to normal hardening, subjecting the stationary race thus hardened to sub-zero treatment, and then subjecting the stationary race to high temperature tempering to reduce the content of residual austenite in the stationary race to not more than 10 vol-% in a Japanese Patent Examined Publication Hei. 7-72565 (hereinafter referring to JP-B-7-72565). In other words, this process is intended to reduce the content of residual austenite in the stationary race so that the hardness of the stationary race is kept high and the plastic deformation of the bearing surface of the stationary race under high vibration and high load is minimized, thereby preventing premature peeling.

As a countermeasure against premature peeling of stationary race there is disclosed in Paragraphs 1 to 14 of "SAE Technical Paper: SAE950944 (held on Feb. 27–Mar. 2, 1995) an explicated mechanism of fatigue of bearing for alternator on the basis of which the grease to be enclosed is changed from E grease to M grease. Because of its high damping effect, M grease can sufficiently absorb vibration and load to prevent premature peeling of the stationary race when applied to bearings operating under high vibration and high load.

On the other hand, a Japanese Patent Examined Publication Hei. 6-33441 (hereinafter referring to JP-B-6-33441) discloses a technique which comprises forming a bearing ring by a steel containing C in an amount of from 0.95 to 1.10% by weight, Si or Al in an amount of from 1 to 2% by weight, Mn in an amount of not more than 0.50% by weight and Cr in an amount of from 0.90 to 1.60% by weight and having an oxygen content of not more than 13 ppm, hardening the bearing ring, and then tempering the bearing ring at a temperature as high as 230° C. to 300° C. to adjust the content of residual austenite and the surface hardness HRC thereof to not more than 8 vol-% and not less than 60, respectively. An object of this technique is to obtain a bearing having a high dimensional stability and a prolonged rolling life in operation at high temperatures.

Further, a Japanese Patent Unexamined Publication No. Hei. 7-103241 (hereinafter referring to JP-A-7-103241) discloses a technique involving the adjustment of the content of residual austenite in the bearing ring of a bearing made of a bearing steel or stainless steel to not more than 6 vol-%. This technique applies to rolling bearing for HDD or audio equipment and is intended to prevent the occurrence of impression on the bearing surface that causes vibration during use, making it possible to improve the acoustic characteristics of the equipment.

However, the techniques disclosed in the JP-B-7-72565 and SAE Technical Paper can exert an effect of preventing premature peeling of the stationary race of a bearing operating under high vibration and high load but leaves something to be desired in the resistance of bearing for engine auxiliary machinery to seizing during use at high temperatures.

In other words, when such a bearing is used at an ambient temperature as high as not lower than 100° C. over an extended period of time, the inner ring as a rotating race tends to have a temperature of 10° C. or more higher than that of the outer ring as a stationary race. This is attributed to the fact that the frictional heat developed on the bearing during rotation can be dissipated more fairly through the housing, to which the outer ring is fixed, than through the shaft, to which the inner ring is fixed. Thus, the decomposed amount of residual austenite is greater in the inner ring, which has a higher temperature than the outer ring, than in the outer ring. This causes an increase in the bearing diameter of the inner ring, causing a decrease in the gap of the bearing. As a result, seizing can easily occur.

Further, the JP-B-6-33441 and the JP-A-7-103241 have no description intended for the prevention of the foregoing seizing during use at high temperatures.

Moreover, in the technique described in the JP-B-6-33441, the oxygen content is defined to not more than 13 ppm because the content of Si or Al in the steel constituting the stationary race is as much as 1 to 2% by weight. However, this technique is liable to production of huge silicon-based or alumina-based inclusions causing remarkable deterioration of rolling life.

Further, the technique described in the JP-A-7-103241 can effectively apply to ball bearing having a pitch circle having a diameter of not more than 11 mm in which a plurality of balls having a diameter of not more than 3 mm are arranged such as small-sized ball bearing and miniature ball bearing having an inner diameter of less than 10 mm but leaves something to be desired in peeling resistance and seizing resistance when applied to bearing for engine auxiliary machinery having an inner diameter of not less than 10 mm which operates at higher temperatures under higher vibration than for HDD or audio equipment.

SUMMARY OF THE INVENTION

The present invention has been worked out focusing our attention to these prior art problems. An object of the present invention is to provide a rolling bearing for engine auxiliary machinery which can operate at high temperatures under high vibration and high load over a drastically prolonged period of lifetime due to its high effect of preventing both premature peeling and seizing.

The foregoing object of the present invention can be accomplished with a rolling bearing comprising a stationary race, a rotating race and a plurality of rolling elements provided between the stationary race and said rotating race which are lubricated with a grease, wherein the rotating race is made of a steel material containing:

0.65 to 1.20% by weight of C;
0.10 to 0.70% by weight of Si;
0.20 to 1.20% by weight of Mn; and
0.20 to 1.80% by weight of Cr,
wherein a content of retained austenite of the rotating ring after subjecting to a heat treatment (as a completed product) is from 0 to 6% by volume, and a surface hardness HRC of a bearing surface of the rotating ring after subjecting to the heat treatment is less than 57 to not more than 65.

In the above-mentioned rolling bearing, it is preferable that a content of retained austenite of each rolling element is from 0 to 6% by volume after subjecting to a heat treatment.

In the above-mentioned rolling bearing, it is also preferable that a content of retained austenite of the stationary ring is not less than 7% by volume after subjecting to a heat treatment.

In the aforementioned rolling bearing, it is more preferable that a surface hardness HRC of a bearing surface of the stationary ring after subjecting to the heat treatment is between 60 and 65.

The above-mentioned object can also be attained by a rolling bearing comprising:

a stationary race, a rotating race and a plurality of rolling elements provided between the stationary race and the rotating race and lubricated with a grease, wherein the stationary race is made of a steel material containing:

0.65 to 1.20% by weight of C;
0.10 to 0.70% by weight of Si;
0.20 to 1.20% by weight of Mn; and
0.20 to 1.80% by weight of Cr,
wherein a content of retained austenite of the stationary ring after subjecting to a heat treatment (as a completed product) is not less than 7% by volume, and a surface hardness HRC of a bearing surface of the stationary ring after subjecting to the heat treatment is between 60 and 65.

Moreover, in the above-mentioned rolling bearing, it is preferable that the steel material further has:

an oxygen content of not more than 16 ppm.

DETAILED DESCRIPTION OF THE PREFERRED EMBODIMENTS

Figure 1:
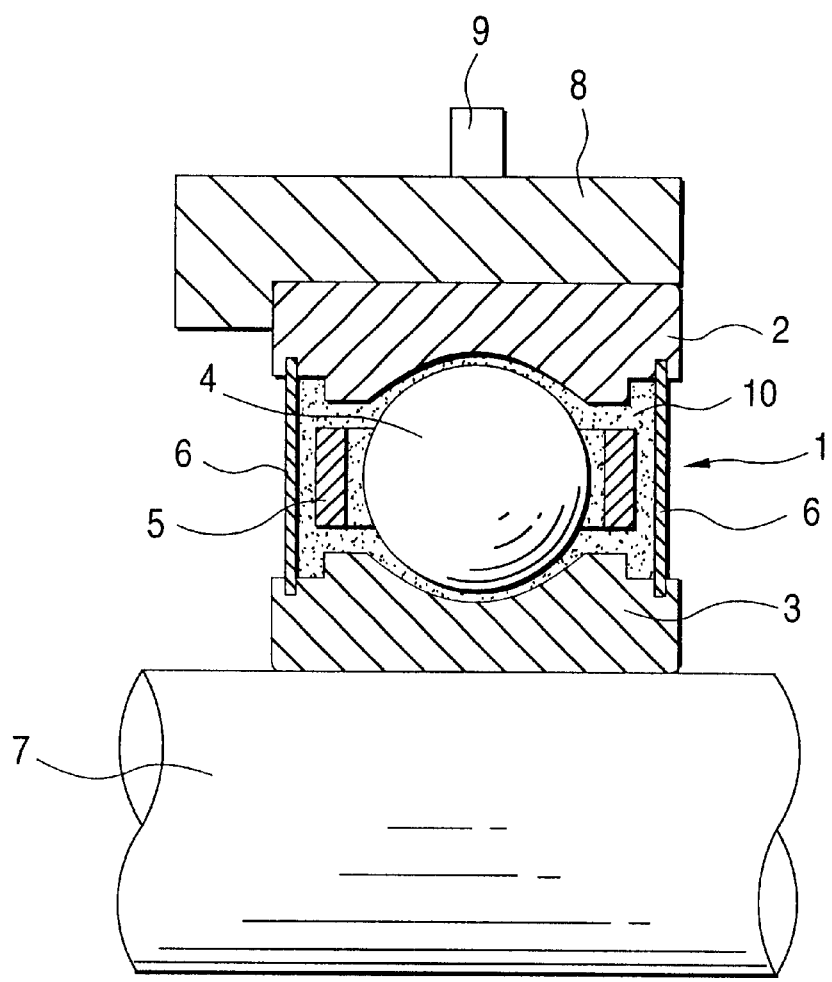
FIG. 1. is a sectional view illustrating a rolling bearing corresponding to an embodiment of the present invention.

In the present invention, the composition of the steel material constituting the rotating race is arranged such that the content of C, Si, Mn, Cr and O fall within the above defined ranges. The critical significance of the definition of these values will be described hereinafter.

[C: 0.65 to 1.20% By Weight]

Carbon is an element which provides steel with hardness. If the carbon content falls below 0.65%, the resulting steel material cannot be occasionally secured with hardness (not less than 57 in terms of Rockwell hardness of scale C (HRC)) required for rolling bearing. Carbon undergoes solid solution in the matrix and combines with other alloying element (particularly Cr) to produce a carbide. If the carbon content exceeds 1.20% by weight, huge carbides can easily be produced during steel making, possibly deteriorating fatigue life or impact resistance.

[Si: 0.10 to 0.70% By Weight]

Silicon is an element which acts as a deoxidizer during steel making to enhance the harden ability of the steel material as well as retard the structural change of the steel material. If the silicon content falls below 0.1% by weight, the resulting deoxidizing effect is not sufficient. On the contrary, if the silicon content exceeds 0.7% by weight, it causes a remarkable deterioration of workability. At the same time, silicate-based inclusions which are thought to remarkably deteriorate toughness or durability can be produced.

[Mn: 0.20 to 1.20% By Weight]

Manganese is an element which exerts an effect of enhancing the harden ability of steel. If the manganese content falls below 0.20% by weight, the resulting effect is insufficient. On the contrary, if the manganese content exceeds 1.20% by weight, the resulting steel exhibits a deteriorated workability. Further, silicon forms MnS with silicon, if any, as an inclusion which causes the reduction of life. Thus, it is preferred that the silicon content be not more than 0.02% by weight to minimize the produced amount of MnS.

[Cr: 0.20 to 1.80% By Weight]

Chromium is an element which improves the harden ability of steel and accelerate the spheroidization of carbide. If the chromium content falls below 0.20% by weight, these effects cannot be substantially exerted. Further, chromium can combine with carbon to form huge carbides. Thus, chromium, if present in a high content, can deteriorate the machinability of steel. In order to avoid these troubles, the upper limit of chromium content is defined to 1.80% by weight.

[O≦16 ppm]

Oxygen is an element which forms an oxide-based inclusion (e.g., $Al_2O_3$, CaO) in the steel to reduce the rolling life of bearing. If the oxygen content exceeds 16 ppm, the rolling life of bearing is remarkably reduced. Thus, the upper limit of the oxygen content is defined to 16 ppm.

[Content of Residual Austenite: 0 to 6 vol-%]

A large number of rotating races (inner rings) were formed by a steel material having the same composition satisfying the requirements of the present invention. These rotating races were then subjected to heat treatment under different conditions to prepare rotating races having different contents of residual austenite from which rolling bearings were assembled. These rolling bearings were then subjected to rolling life test at high temperature under high vibration and high load. As a result, it was found that if the content of residual austenite exceeds 6% by volume, the life is extremely reduced. The less the content of residual austenite is, the higher is the effect of preventing seizing during use at high temperatures. In particular, the content of residual austenite is preferably not more than 4% by volume.

[Hardness HRC of Bearing Surface: From Not Less Than 57 to Not More Than 65]

If HRC falls below 57, sufficient rigidity required for bearing cannot be obtained. If HRC exceeds 65, the resulting bearing surface exhibits a deteriorated toughness that remarkably deteriorates crack propagation resistance.

The foregoing definition of steel material composition and content of residual austenite prevents dimensional change (expansion of the inner ring diameter) of rotating race, which less effectively dissipate heat as compared with the stationary race, during use at high temperatures, making it possible to prevent the reduction of the, gap of bearing. As a result, seizing during use at high temperatures can be prevented, making it possible to prolong the rolling life of the bearing. Further, the definition of the oxygen content among the steel material composition prevents the production of nonmetallic inclusions. The prevention of the production of nonmetallic inclusions and the definition of the hardness of bearing surface result in a further increase of the rolling life of bearing.

Moreover, the definition of the content of residual austenite in the rolling element a range of from 0 to 6% by volume prevents the expansion of the rolling element during use at high temperatures, making it possible to further enhance the effect of preventing seizing.

Further, the rolling bearing comprising a plurality of rolling elements provided between a stationary race and a rotating race which are lubricated with a grease, characterized in that at least the rotating race is formed by a steel material containing as alloying constituents C, Si, Mn and Cr in an amount of from 0.65 to 1.20% by weight, from 0.10 to 0.70% by weight, from 0.20 to 1.20% by weight and from 0.20 to 1.80% by weight, respectively, and having an oxygen content of not more than 16 ppm, the content of austenite left after heat treatment is from 0 to 6% by volume and the hardness HRC of the bearing surface is from not less than 57 to not more than 65 and that the stationary race is formed by a steel material having the same composition as mentioned above, the content of austenite left after heat treatment is not less than 7% by volume and the hardness HRC of the bearing surface is from not less than 60 to not more than 65 exhibits a prolonged rolling life as compared with one having a residual austenite content of from 0 to 6% by volume both in rotating race and stationary race.

Table 1 shows the difference in rolling life among various combinations of inner ring (rotating race) and outer ring (stationary race) having different residual austenite contents ($\gamma_R$).

TABLE 1

|   | Inner ring | Outer ring | Rolling life | Dimensional stability |
|---|---|---|---|---|
| A | $\gamma_R$ = 0 to 6% | $\gamma_R \geq$ 7% | ○ | ○ |
| B | $\gamma_R$ = 0 to 6% | $\gamma_R$ = 0 to 6% | X | ○ |
| C | $\gamma_R \geq$ 7% | $\gamma_R \geq$ 7% | ○ | X |
| D | $\gamma_R \geq$ 7% | $\gamma_R$ = 0 to 6% | X | X |

It can be seen in Table 1 that if the residual austenite content in the inner ring is from 0 to 6% by volume, the expansion of the inner ring diameter during use at high temperatures can be prevented to enhance the dimensional stability. On the contrary, if the residual austenite content in the inner ring is not less than 7% by volume, the resulting inner ring exhibits a deteriorated dimensional stability. Further, if the residual austenite content in the outer ring is not less than 7% by volume, the resulting outer ring exhibits an enhanced impression resistance that prolongs the rolling life of bearing. On the contrary, if the residual austenite content in the outer ring is from 0 to 6% by volume, the resulting outer ring exhibits an insufficient impression resistance that shortens the rolling life of the bearing.

Accordingly, the combinations of type B, C and D leave something to be desired in either dimensional stability of inner ring or rolling life of the bearing. On the other hand, the combination of type A is excellent both in dimensional stability of the inner ring and rolling life of the bearing. In other words, the rolling bearing comprising an inner ring having a residual austenite content of from 0 to 6% by volume and an outer ring having a residual austenite content of not less than 7% by volume in combination is excellent both in dimensional stability of the inner ring and rolling life of the bearing.

Namely, in the case where it is required to provide an inner ring having improved dimensional stability and an excellent effects for preventing seizing during use at high temperature, the inner ring should preferably have a residual austenite content of from 0 to 6% by volume. At this time, it is also possible to prevent a creep (between the inner periphery of the inner ring and the shaft) from generating and to suppress the heating of the inner ring into a small amount. (Refer to types A and B in Table 1.)

On the other hand, in the case where it is required for an outer ring to prevent the peeling and to improve an impression resistance while maintaining a surface hardness of its bearing surface, the outer ring should preferably have a residual austenite content of not more than 7% by volume. (Refer to types A and C.)

Note that a rolling bearing comprising an inner ring having a residual austenite content of from 0 to 6% by volume and an outer ring having a residual austenite content of not less than 7% by volume in combination as mentioned above (Refer to Type A), is excellent in rolling life of the bearing which is the longest as compared with the another types while preventing the creep from occurring, so that it is possible to use the same bearing under a high load and high vibration from high speed rotation.

Hereinafter, Embodiments of the present invention will be described in the following examples and comparative examples. FIG. 1 is a sectional view illustrating an embodiment of the rolling bearing according to the present invention.

The rolling bearing 1 is a deep groove ball bearing of JIS designation number 6303 comprising an outer ring 2 fixed to a housing 8 as a stationary race and an inner ring 3 fitted on a shaft 7 as a rotating race. Provided between the outer ring 3 and the inner ring 2 are a large number of rolling elements 4 supported by a cage 5. Fitted between the outer ring 2 and the inner ring 3 on both sides of the cage 5 are sealing members 6, 6. Enclosed in the space surrounded by the sealing members 6, 6 is the previously mentioned grease M as a grease 10.

In the operation of the rolling bearing 1, the inner ring 3 rotates as the shaft 7 rotates. The resulting vibration and load from the shaft 7 act on the loaded zone of the outer ring 2 through the inner ring 3 and the rolling element 4.

The inner ring 3 was formed by a steel material having the composition set forth in Table 2 below, and then subjected to hardening and tempering under any of the following conditions to have a hardness (HRC) and a residual austenite content ($\gamma_R$) set forth in Table 2 below.

[Hardening and Tempering Conditions]

Condition I: Hardened at a temperature of 840° C., tempered at a temperature of 160° C.

Condition II: Hardened at a temperature of 840° C., tempered at a temperature of 200° C.

Condition III: Hardened at a temperature of 840° C., tempered at a temperature of 250° C.

Condition IV: Hardened at a temperature of 840° C., tempered at a temperature of 300° C.

Condition V: Hardened at a temperature of 840° C., tempered at a temperature of 400° C.

Condition VI: Hardened at a temperature of 840° C., sub-zero-treated at a temperature of −80° C., tempered at a temperature of 160° C.

TABLE 2

| | | % C content | % Si content | % Mn content | % Cr content | oxygen content (ppm) | Heat treatment | $H_{RC}$ Hardness | % $\gamma_R$ |
|---|---|---|---|---|---|---|---|---|---|
| Example No. | 1 | 0.65 | 0.24 | 0.53 | 1.76 | 16 | I | 61 | 6 |
| | 2 | 0.97 | 0.10 | 1.10 | 0.77 | 13 | I | 63 | 5 |
| | 3 | 0.97 | 0.24 | 0.38 | 1.58 | 9 | II | 59 | 2 |
| | 4 | 0.87 | 0.18 | 1.20 | 1.33 | 7 | II | 60 | 1.5 |
| | 5 | 0.80 | 0.41 | 0.94 | 0.50 | 11 | III | 58 | 1 |
| | 6 | 0.99 | 0.15 | 0.50 | 1.60 | 5 | III | 58 | 0.5 |
| | 7 | 1.08 | 0.70 | 0.23 | 1.37 | 10 | IV | 57 | 0 |
| | 8 | 1.20 | 0.45 | 0.87 | 0.20 | 9 | IV | 57 | 0 |
| | 9 | 1.15 | 0.35 | 0.21 | 1.31 | 10 | VI | 65 | 4 |
| | 10 | 0.75 | 0.37 | 0.44 | 1.80 | 8 | VI | 64 | 3 |
| Comparative Example No. | 1 | 0.60 | 0.18 | 0.34 | 1.45 | 14 | II | 55 | 6 |
| | 2 | 1.37 | 0.27 | 0.25 | 1.39 | 10 | II | 59 | 5 |
| | 3 | 0.95 | 1.98 | 0.10 | 1.05 | 8 | III | 58 | 3 |
| | 4 | 0.87 | 0.05 | 1.56 | 0.78 | 7 | III | 58 | 4 |
| | 5 | 0.80 | 0.24 | 0.28 | 2.7 | 9 | III | 58 | 4 |
| | 6 | 0.85 | 0.67 | 0.94 | 1.45 | 23 | III | 57 | 3 |
| | 7 | 0.90 | 0.13 | 0.20 | 1.48 | 11 | V | 55 | 0 |
| | 8 | 0.78 | 0.19 | 0.33 | 0.59 | 10 | VI | 60 | 8 |
| | 9 | 1.10 | 0.38 | 0.26 | 1.34 | 9 | I | 61 | 9 |
| | 10 | 0.65 | 0.31 | 0.30 | 1.57 | 8 | I | 61 | 15 |

In both the examples and comparative examples, the outer ring 2 and the rolling element 4 were formed by the same high carbon-chromium bearing steel of the second type (SUJ2), and then subjected to heat treatment under Condition I to have a residual austenite content of from 3 to 5% by volume and a surface hardness HRC of 62. In this arrangement, the surface roughness Ra of the inner ring 3 and the outer ring 2 was from 0.01 to 0.04 μm. and the surface roughness Ra of the rolling element 4 was from 0.003 to 0.010 μm.

The rolling bearings 1 comprising different inner rings 3 (Examples 1 to 10, Comparative Examples 1 to 10) and the same outer ring 2 and rolling element 4 thus prepared were then subjected to a life test in the same manner.

As the testing machine there was used a bearing life testing machine as disclosed in a Japanese Patent Unexamined Publication No. Hei. 9-89724 (Hereinafter referring to JP-A-9-89724). The rotary speed was switched from 9,000 rpm to 18,000 rpm or vice versa at a predetermined interval of time (e.g., 9 seconds) to give a rapid acceleration and deceleration test. The life test was conducted at a temperature of 130° C. under load conditions of 0.10 in terms of P (load)/C (dynamic nominal load) with the gap of the rolling bearing 1 being from 10 to 15 μm.

Since the calculated life (theoretical maximum life) of the rolling bearing 1 under these conditions is 1,350 hours, the testing time was predetermined to be 1,500 hours at maximum. For this life test, 10 samples were prepared for each of Examples 1 to 10 and Comparative Examples 1 to 10. The time required until these samples show troubles such as seizing or peeling was then measured. The shortest time required until any one of the ten samples show troubles was used for evaluation of lifetime to be tested). These results are set forth in Table 3 below.

The underlined figure in Table 3 deviates from the range defined in the present invention. When all the ten samples showing no seizing, peeling or other troubles until the maximum testing time passed, the life time was evaluated to be 1,500 hours.

TABLE 3

| | | Lifetime evaluated (hr) | Condition | Cause |
|---|---|---|---|---|
| Example No. | 1 | 1,357 | 3/10 seized | $\gamma_R$ = 6% |
| | 2 | 1,404 | 2/10 seized | $\gamma_R$ = 5% |
| | 3 | 1,500 | No troubles | |
| | 4 | 1,500 | No troubles | |
| | 5 | 1,500 | No troubles | |
| | 6 | 1,500 | No troubles | |
| | 7 | 1,500 | No troubles | |
| | 8 | 1,500 | No troubles | |
| | 9 | 1,500 | No troubles | |
| | 10 | 1,500 | No troubles | |
| Comparative Example No. | 1 | 415 | 10/10 peeled on inner ring | Started at matrix |
| | 2 | 525 | 8/10 peeled on inner ring | Started at huge carbide |
| | 3 | 795 | 3/10 peeled on inner ring | Started at silicon-based inclusion |
| | 4 | 711 | 4/10 peeled on inner ring | Started at MnS-based inclusion |
| | 5 | 504 | 7/10 peeled on inner ring | Started at huge chromium carbide |
| | 6 | 781 | 5/10 peeled on inner ring | Started at $Al_2O_3$-based inclusion |
| | 7 | 487 | 10/10 peeled on inner ring | Started at matrix |
| | 8 | 204 | 10/10 seized | $\gamma_R$ = 8% |
| | 9 | 151 | 10/10 seized | $\gamma_R$ = 9% |
| | 10 | 128 | 10/10 seized | $\gamma_R$ = 15% |

As can be seen in the results of the life test, a lifetime longer than the calculated lifetime of 1,350 hours can be obtained in the life test at high temperature under high vibration and high load only when the composition of the steel material constituting the inner ring 3 satisfies the following requirements:

C: 0.65 to 1.20% by weight;
Si: 0.10 to 0.70% by weight;
Mn: 0.20 to 1.20% by weight;
Cr: 0.20 to 1.80% by weight; and
O: 0≦16 ppm, the content of austenite left after heat treatment is from 0 to 6% by volume and the hardness HRC of the bearing surface is from not less than 57 to not more than 65 (Examples 1 to 10).

The rolling bearings of Examples 1 and 2 had a residual austenite content as relatively great as 6% by volume and 5% by volume, respectively, and thus underwent seizing at a ratio of 3 per 10 samples and 2 per 10 samples, respectively. However, the rolling bearings of Examples 1 and 2 exhibited a rolling life longer than the calculated lifetime of 1,350 hours and about twice or more times that of Comparative Examples 1 to 10. The bearing samples which had undergone no seizing among the samples of Examples 1 and 2 were then measured for expansion of the bearing diameter of the inner ring after test. The results were from 5 to 10 μm. The bearing samples which had undergone seizing showed a greater expansion.

The rolling bearings of Examples 3 to 10 exhibited a residual austenite content of not more than 4% by volume. Thus, none of these samples showed troubles such as seizing and peeling until the maximum testing time passed. The rolling bearings of Examples 3 to 10 were measured for expansion of the bearing diameter of the inner ring after test. The results were not more than 5 μm. The condition of the bearing surface was then observed. As a result, the bearing surface showed a good condition. Thus, it was found that such a small drop of the bearing gap is not great enough to cause seizing.

The rolling bearings of Comparative Examples 1 and 7 exhibited a bearing surface hardness HRC as low as 55 and thus exhibited a evaluated lifetime about ⅓ times the calculated lifetime. After the life test, the microstructure of the inner ring was examined. As a result, it was found that the plastic deformation of the inner ring had proceeded extremely. The inner ring was then subjected to analysis of fatigue by X-ray (see "Combination of decrease of half-width and decomposed amount of residual austenite", NSK Bearing Journal No. 643, pp. 1–10, 1982). As a result, the inner ring was found to have inner fatigue, demonstrating that all peeling started at matrix.

The rolling bearings of Comparative Examples 2 and 5 were made of a steel material having high carbon and chromium contents and thus were observed to have huge carbides (chromium carbide) having a size of not less than 10 μm on the bearing surface after heat treatment. As a result of peeling from the bearing surface starting at these carbides, the evaluated lifetime was as short as 525 hours and 504 hours, respectively.

The rolling bearing of Comparative Example 3 was made of a steel material having a silicon content exceeding the range defined herein and thus underwent peeling starting at silicon-based inclusions at the time of about half the calculated life time. The rolling bearing of Comparative Example 4 was made of a steel material having a manganese content exceeding the range defined herein and thus underwent peeling starting at MnS-based inclusions at the time of about half the calculated lifetime. The rolling bearing of Comparative Example 6 was made of a steel material having an oxygen content exceeding the range defined herein and thus underwent peeling starting at alumina-based inclusions at the time of about half the calculated lifetime.

The rolling bearings of Comparative Examples 8 to 10 were made of a steel material having a composition and a bearing surface hardness falling within the range defined herein but a residual austenite content of greater than 6% by volume and thus showed a drop of the bearing gap. As a result, these rolling bearings underwent seizing at the time of about 1/7 to 1/10 of the calculated lifetime.

The inner ring 3, outer ring 2 and rolling elements 4 shown in FIG. 1 were then formed by high carbon-chromium bearing steel of the second type (SUJ2). The inner ring 3 and outer ring 2 thus formed were then subjected to heat treatment under any of the foregoing conditions I to VI to adjust its residual austenite content and bearing surface hardness. The rolling elements 4 thus formed were then all subjected to the same heat treatment (normal heat treatment). In this manner, the inner ring 4 and the outer ring 2 exhibited a surface roughness Ra of from 0.01 to 0.04 μm, and the rolling element 4 exhibited a surface roughness of from 0.003 to 0.010 μm.

These different inner rings and outer rings thus prepared were then assembled into rolling bearings 1 of four types set forth in Table 1 above. As shown in Table 4 below, two kinds of samples were prepared for each of the types A to D. These samples were then subjected to life test under lubrication with M grease at a temperature as high as 130° C. and a rotary speed as high as 10,000 rpm under a high load (P/C=0.4) using the same testing machine as used above. During this testing process, the rotary speed was not changed. In other words, no vibration was generated.

Since the calculated life of the rolling bearing 1 under these conditions is 26 hours, the testing time was predetermined to be 50 hours at maximum. For this life test, 10 samples were prepared for each of the various kinds of samples. The time required until these samples show troubles such as seizing or peeling was then measured. The shortest time required until any one of the ten samples show troubles was used for evaluation of lifetime. These results are set forth in Table 4 below. When all the ten samples showed no seizing, peeling or other troubles until the maximum testing time passed, the life time was evaluated to be 50 hours.

TABLE 4

| | | % $\gamma_R$ of inner ring | $H_{RC}$ of inner ring | % $\gamma_R$ of outer ring | $H_{RC}$ of outer ring | Evaluated lifetime (hr) | Cause of troubles |
|---|---|---|---|---|---|---|---|
| A | 1 | 0.5 | 58 | 9 | 61 | 50 | No troubles |
|   | 2 | 6 | 61 | 13 | 60 | 50 | No troubles |
| B | 1 | 0.5 | 58 | 0.5 | 57 | 27 | 5/10 peeled on outer ring |
|   | 2 | 3 | 58 | 4 | 58 | 30 | 4/10 peeled on outer ring |
| C | 1 | 10 | 62 | 10 | 61 | 21 | 7/10 seized on inner ring |
|   | 2 | 15 | 61 | 12 | 62 | 24 | 8/10 seized on inner ring |
| D | 1 | 9 | 61 | 0.5 | 58 | 11 | 7/10 seized on inner ring 3/10 peeled on outer ring |
|   | 2 | 15 | 62 | 3 | 58 | 15 | 8/10 seized on inner ring 2/10 peeled on outer ring |

As can be seen in the results of the life test, the rolling bearings comprising an inner ring having a residual austenite content of from 0 to 6% by volume and an outer ring having a residual austenite content of not less than 7% by volume in combination (type A) underwent neither peeling nor seizing in the present life test under high load and high temperature conditions and thus exhibited a lifetime longer than the calculated lifetime.

The rolling bearings comprising an inner ring and an outer ring both having a residual austenite content of from 0 to 6% by volume in combination (type B) exhibited an outer ring bearing surface hardness HRC of 57 or 58 and hence a deteriorated impression resistance under a high load, whereas no seizing appeared on the inner ring. As a result, about half the samples of this type of rolling bearing underwent peeling on the outer ring and thus exhibited about the same lifetime as the calculated lifetime.

The rolling bearings comprising an inner ring and an outer ring both having a residual austenite content of not less than 7% by volume in combination (type C) underwent expansion of the dimension of the inner ring bearing surface. That is, since the inner ring has the residual austenite content of 10% by volume which is a relatively large value, seven of ten samples of the inner ring underwent seizing. As a result, these samples of Type C exhibited an evaluated lifetime of 21 hr. Further, since the inner ring has the residual austenite content of 15% by volume which is a relatively large value, eight of ten samples of the inner ring underwent seizing. As a result, these samples of Type C exhibited an evaluated lifetime of 24 hr. At this time, none of peeling is appeared on the outer ring.

The rolling bearings comprising an inner ring having a residual austenite content of not less than 7% by volume and an outer ring having a residual austenite content of from 0 to 6% by volume in combination (type D) underwent expansion of the dimension of the inner ring bearing surface and deterioration of the impression resistance of the outer ring. As a result, these samples underwent seizing on the majority of the inner rings, creeping between the inner ring and the shaft and peeling on some of the outer rings because the bearing surface of the outer rings having the lower surface hardness HRC of 58, and thus exhibited a lifetime shorter than the calculated lifetime.

A rolling bearing assembled in the same combination of inner ring and outer ring as type A except that the high carbon-chromium bearing steel was replaced by induction-hardened steel which was then subjected to heat treatment to have a residual austenite content adjusted to the predetermined range gave the same effect as obtained with high carbon-chromium bearing steel.

As mentioned above, the production process according to the present invention involves the definition of the composition of the steel material constituting the rotating race, the residual austenite content in the steel material and the hardness of the bearing surface, making it possible to drastically prolong the lifetime of rolling bearing operating at high temperatures under high vibration and load.

The present invention is based on Japanese Patent Application No. Hei. 10-053724, which is incorporated herein by reference.

While the present invention has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A rolling bearing comprising:
   a stationary race;
   a rotating race; and
   a plurality of rolling elements provided between said stationary race and said rotating race and lubricated with a grease,
   wherein at least one of the rotating race and the stationary race is made of a steel material containing:
   0.65 to 1.20% by weight of C;
   0.10 to 0.70% by weight of Si;
   0.20 to 1.20% by weight of Mn; and
   0.20 to 1.80% by weight of Cr,
   wherein said steel material further comprises an oxygen content of not more than 16 ppm, and
   wherein a content of retained austenite of said rotating race after subjecting to a heat treatment is from 0 to 6% by volume, and wherein a content of retained austenite of said stationary race is not less than 7% by volume after subjecting to a heat treatment.

2. The rolling bearing according to claim 1, wherein the content of retained austenite of said rotating race after subjecting to the heat treatment is from 0 to 4% by volume.

3. The rolling bearing according to claim 1, wherein a content of retained austenite of each of said rolling elements after subjecting to a heat treatment is from 0 to 6% by volume.

4. The rolling bearing according to claim 1, wherein a surface hardness HRC of a bearing surface of said rotating race after subjecting to the heat treatment is from not less than 57 to not more than 65, and a surface hardness HRC of a bearing surface of said stationary race after subjecting to the heat treatment is from not less than 60 to not more than 65.

5. A rolling bearing according to claim 1, wherein said rolling bearing is a bearing for engines auxiliary machinery.

6. The rolling bearing according to claim 2, wherein a surface hardness of HRC of a bearing surface of said rotating race after subjecting to the heat treatment is from not less than 57 to not more than 65, and a surface hardness HRC of a bearing surface of said stationary race after subjecting to the heat treatment is from not less than 60 to not more than 65.

7. A rolling bearing according to claim 2, wherein said rolling bearing is a bearing for engine auxiliary machinery.

8. A rolling bearing according to claim 3, wherein said rolling bearing is a bearing for engine auxiliary machinery.

9. A rolling bearing according to claim 4, wherein said rolling bearing is a bearing for engine auxiliary machinery.

10. A rolling bearing according to claim 6, wherein said rolling bearing is a bearing for engine auxiliary machinery.

* * * * *